United States Patent [19]
Bond et al.

[11] Patent Number: 6,026,238
[45] Date of Patent: Feb. 15, 2000

[54] INTERFACE CONVERSION MODULES BASED UPON GENERALIZED TEMPLATES FOR MULTIPLE PLATFORM COMPUTER SYSTEMS

[75] Inventors: Barry Bond, Renton; Ori Gershony, Seattle; David E. Hastings, Carnation; Jonathan C. Lew, Redmond; Alan M. Warwick, Bellevue, all of Wash.

[73] Assignee: Microsoft Corpratrion, Redmond, Wash.

[21] Appl. No.: 08/912,454

[22] Filed: Aug. 18, 1997

[51] Int. Cl.$^7$ ..................................................... G06F 9/455
[52] U.S. Cl. ...................... 395/705; 395/500.41; 709/302
[58] Field of Search ..................................... 395/500, 705, 395/682, 500.41; 709/302

[56] References Cited

U.S. PATENT DOCUMENTS

| | | | |
|---|---|---|---|
| 5,390,314 | 2/1995 | Swanson .................................. | 395/705 |
| 5,680,551 | 10/1997 | Martino, II .............................. | 709/226 |
| 5,729,748 | 3/1998 | Robbins et al. ......................... | 395/705 |
| 5,754,858 | 5/1998 | Broman et al . ........................ | 395/701 |
| 5,764,947 | 6/1998 | Murphy et al. ..................... | 395/500.41 |

OTHER PUBLICATIONS

O'Malley, S., et al., "USC: A Universal Stub Compiler", *Computer Communication Review*, vol. 24, pp. 295–306, (Oct. 1994).

Wei, Y., et al., "The design of a stub generator for heterogeneous RPC Systems", *Journal of Parallel and Distributed Computing*, vol. 11, pp. 188–197, (1991).

*Primary Examiner*—Kenneth S. Kim
*Attorney, Agent, or Firm*—Schwegman, Lundberg, Woessner & Kluth, P.A.

[57] ABSTRACT

A utility program develops and updates an API-translation layer of an emulator for running programs written for one platform on another platform. This speeds the development of code such as operating-systems upgrades, where the API set can change frequently. The utility builds a module for each API from a set of templates to execute the module's function on the other platform. Generalized function templates iterate through API functions. Exception templates can override the generalized templates in specific cases. Types templates convert individual arguments of the API. Code templates contain code for incorporation into a number of other templates.

22 Claims, 4 Drawing Sheets

INTERFACE CONVERSION MODULES BASED UPON GENERALIZED TEMPLATES FOR MULTIPLE PLATFORM COMPUTER SYSTEMS

FIELD OF THE INVENTION

The present invention relates to electronic data processing, and more specifically concerns a software tool for generating a set of translation-code modules for translating application-program interfaces (APIs) from one platform to another, for use with an emulator which allows application programs written for one platform to be executed on a different platform.

BACKGROUND OF THE INVENTION

Present-day application programs almost never interface directly to the hardware of the computer system in which they execute. Instead, application program interfaces (APIs) call code modules which control the hardware, or which call programmed interfaces at yet lower levels. Most API code modules reside in an operating system (OS), although others may exist in a basic input/output system (BIOS), or in other places. Code modules for API functions typically reside in freestanding dynamic link library (DLL) files each containing routines for carrying out dozens or even hundreds of API functions.

Executing an application program written for one computer processor, operating system, or other platform on another platform requires a program, variously known as an emulator, simulator, interpreter, or translator, to convert instructions, data formats, application-program interfaces (APIs), and other characteristics of the application from those of its original platform to those of the native platform in which the emulator runs. Sometimes the original platform has been replaced, but the old application must still be run on the new platform. Sometimes programs are written to an abstract platform, so that the same application can be executed on numerous different platforms merely by writing an emulator for each native platform that is to host the abstract platform.

An emulator subsystem generally has two major components. The emulator itself converts the original processor instructions from the application into instructions or groups of instructions appropriate to the processor of the new platform, and executes them. An API translation layer "thunks" API calls from the original platform being emulated into calls to APIs written for the native platform; that is, it intercepts API calls made by an application written for the emulated platform, converts their arguments from the calling convention of the original platform to that of the native platform, then calls an appropriate native-platform module for executing the API function. A translation module or "API thunk" is a piece of program code in the translation layer which executes between a particular original API and the operating system running on the native platform.

Conventional practice involves hand-writing thunk code for each new and modified API. However, an API set may change daily during the development of an operating system. Also, the number of APIs can be very large. The Microsoft Windows NT operating system, for example, contains more than 3,500 APIs in 42 different DLL modules. Therefore, manual production of individual API translation code becomes increasingly impractical. Increasingly shorter product cycles compounds this problem.

Some interface modules or thunks have been generated from handwritten descriptors for each separate API. However, these must be maintained separately from the APIs themselves, and thus involve costly additional effort. They also suffer from "synchronization" problems: if one or more modules inadvertently escape an update between one development iteration and the next, their down-level code may mistranslate an API, or may crash the system. Such problems can be difficult to find, thus forcing the entire development effort to wait.

Alternatively, a software tool has been employed to create a set of skeleton API thunks as C-language source files which were then hand-modified. This approach is impractical, in that rerunning the tool destroys all the hand edits.

SUMMARY OF THE INVENTION

A utility program according to the present invention creates and automatically updates code modules for translating APIs written for one platform so that they will execute properly on a different platform. The utility, executed for every new development iteration of an operating system or other software environment, uses a set of templates for constructing source code for the translation modules, based upon the functions performed by the APIs. Special translation requirements are handled by exception templates containing personalized translation code. Another kind of template performs type conversions from the original API's parameters or arguments into those of the different platform.

Automatic code generation in this manner enables much faster development iterations by providing an automated method of synchronizing the translation modules with changes made to the new operating system or environment. The code generator ensures that all translation modules are at the current updated level, which prevents system crashes caused by incompatible modules. It also greatly reduces errors within individual code modules resulting from prior hand generation methods, and eliminates errors across module caused from different people working independently on different modules.

Other features and advantages, as well as modifications and additions within the scope of the invention, will appear to those skilled in the art from the following description.

DETAILED DESCRIPTION

Figure 1:
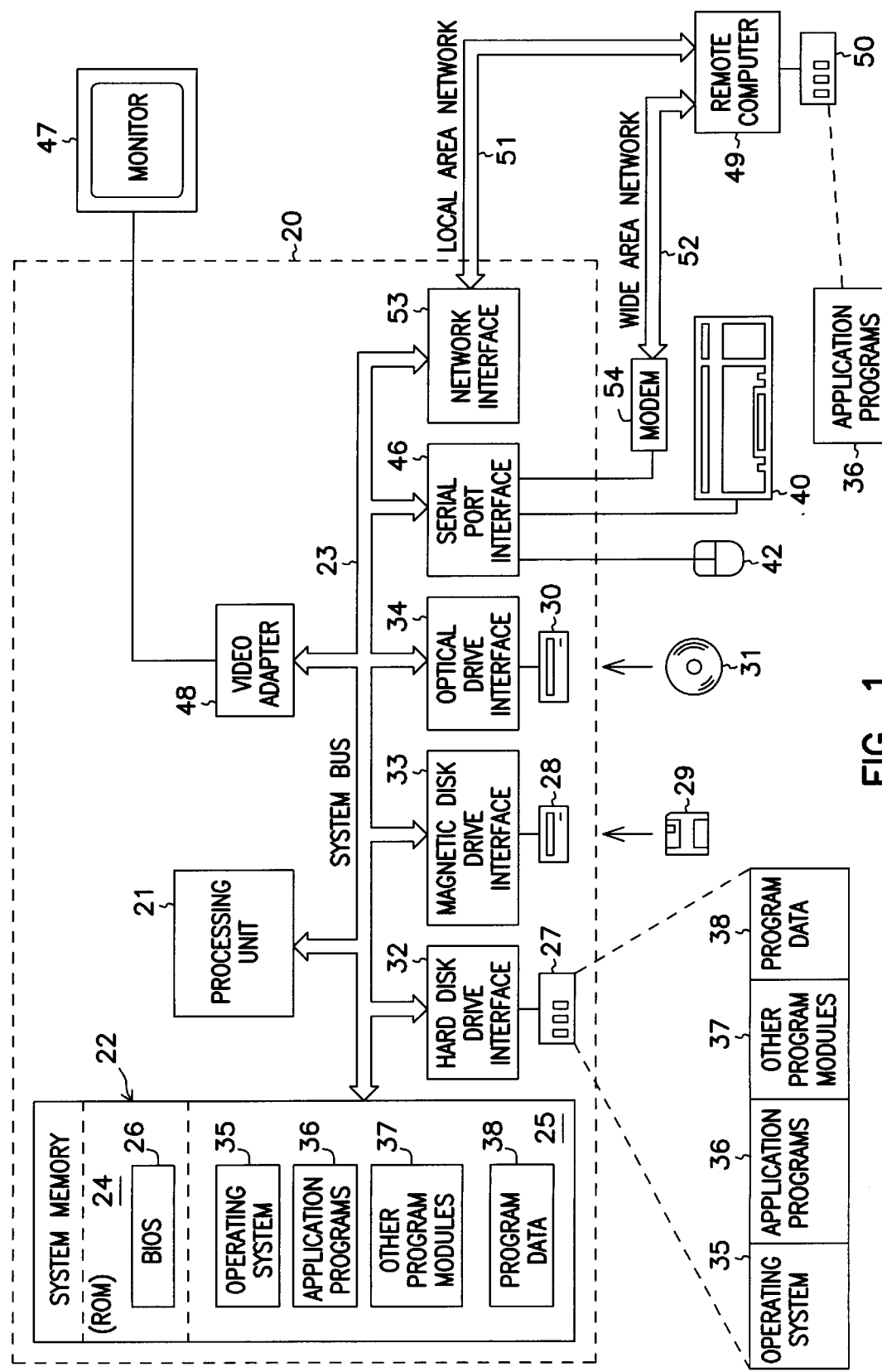
FIG. 1 is a block diagram of a computer system in which the invention may be practiced.

FIG. 1 provides a brief, general description of a suitable computing environment in which the invention may be implemented. Hardware and software environments will first be discussed, followed by a detailed description of the invention comprising a tool for creating and automatically updating code modules for translating APIs written for one platform so that they will execute properly on a different platform. The invention will hereinafter be described in the general context of computer-executable instructions such as program modules, executed by a personal computer (PC); however, other environments are possible. Program modules include routines, programs, objects, components, data structures, etc. that perform particular tasks or implement particular abstract data types. Those skilled in the art will appreciate that the invention may be practiced with other computer-system configurations, including hand-held devices, multiprocessor systems, microprocessor-based programmable consumer electronics, network PCs, minicomputers, mainframe computers, and the like. The invention may also be practiced in distributed computing environments where tasks are performed by remote processing devices linked through a communications network. In a distributed computing environment, program modules may be located in both local and remote memory storage devices.

FIG. 1 shows an exemplary system for implementing the invention. It employs a general-purpose computing device in the form of a conventional personal computer 20, which includes processing unit 21, system memory 22, and system bus 23 that couples the system memory and other system components to processing unit 21. System bus 23 may be any of several types, including a memory bus or memory controller, a peripheral bus, and a local bus, and may use any of a variety of bus structures. System memory 22 includes read-only memory (ROM) 24 and random-access memory (RAM) 25. A basic input/output system (BIOS) 26, stored in ROM 24, contains the basic routines that transfer information between components of personal computer 20. BIOS 24 also contains start-up routines for the system. Personal computer 20 further includes hard disk drive 27 for reading from and writing to a hard disk (not shown), magnetic disk drive 28 for reading from and writing to a removable magnetic disk 29, and optical disk drive 30 for reading from and writing to a removable optical disk 31 such as a CD-ROM or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. Such media may include magnetic cassettes, flash-memory cards, digital versatile disks, Bernoulli cartridges, RAMs, ROMs, and the like.

Program modules may be stored on the hard disk, magnetic disk 29, optical disk 31, ROM 24 and RAM 25. Program modules may include operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial-port interface 46 coupled to system bus 23; but they may be connected through other interfaces not shown in FIG. 1, such as a parallel port, a game port, or a universal serial bus (USB). A monitor 47 or other display device also connects to system bus 23 via an interface such as a video adapter 48. In addition to the monitor, personal computers typically include other peripheral output devices (not shown) such as speakers and printers.

Personal computer 20 may operate in a networked environment using logical connections to one or more remote computers such as remote computer 49. Remote computer 49 may be another personal computer, a server, a router, a network PC, a peer device, or other common network node. It typically includes many or all of the components described above in connection with personal computer 20; however, only a storage device 50 is illustrated in FIG. 1. The logical connections depicted in FIG. 1 include local-area network (LAN) 51 and a wide-area network (WAN) 52. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20, and connects to system bus 23 via serial-port interface 46. In a networked environment, program modules depicted as residing within 20 or portions thereof may be stored in remote storage device 50. Of course, the network connections shown are illustrative, and other means of establishing a communications link between the computers may be substituted.

Figure 2:
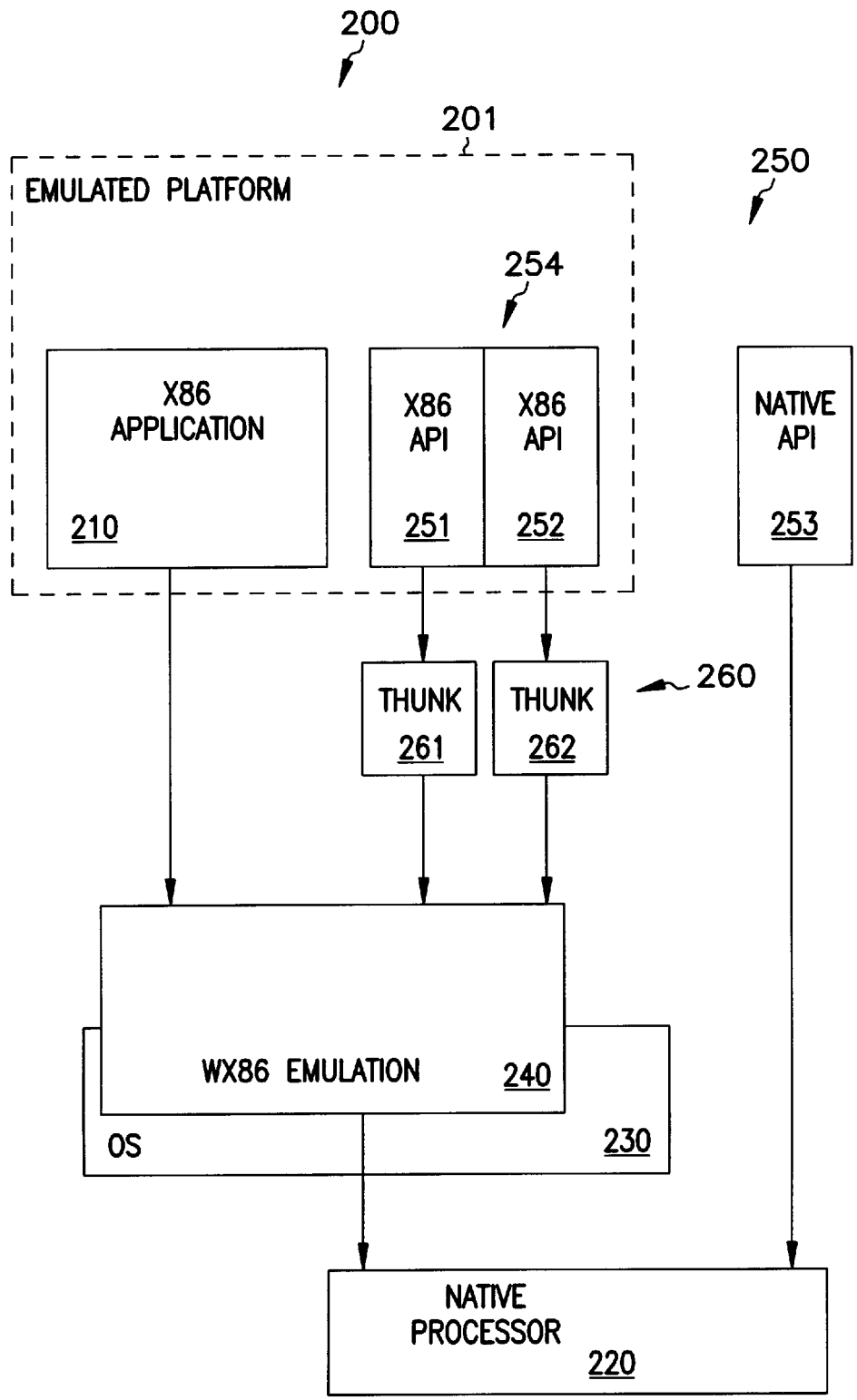
FIG. 2 is a high-level block diagram of a multiple-platform emulation environment in which the invention finds utility.

FIG. 2 shows a software environment 200 for running an application program 210 for one platform on a processor 220 representing a different platform. The elements enclosed in dashed line 201 are elements designed to be executed on a first platform such as a processor 21, FIG. 1, of the Intel "X86" family, for example, an Intel 80386, 80486, or Pentium microprocessor. The other elements execute on a second platform, such as a Digital Equipment Corp. "Alpha" or an IBM "PowerPC" microprocessor serving as processor 21. This description refers to the first and second platforms as the "X86" and "native" platforms, respectively. For purposes of illustration, a native-platform version 230 of the Microsoft NT operating system serves as OS 35, FIG. 1.

Conventional emulator program 240 translates the instructions, data, and interfaces (APIs) of an X86-platform application program such as 36, FIGS. 1 and 2, from those of the X86 platforms to equivalent operations in the native platform. The APIs of an application program are actually calls to a set 250 of API modules 251–253, only a very few of which are shown in FIG. 2. API modules are commonly grouped into dynamic link libraries such as 254. As noted previously, OS 230 has thousands of APIs in more than 40 DLLs; this set, collectively known as "Win32" is recompiled into a new "build" almost daily during a development effort. When application 210 calls an API written for the X86 platform, such as API 251, a conventional API translation layer 241 in emulator 240 retrieves the proper API module 251, and calls an associated translation-code module, or "thunk," 261 to convert any API arguments and data to the correct format for the native platform, and to perform functions which emulate those the API would have performed on the original X86 platform. The set of thunks 260 includes a separate module 261–262 for each X86 API 251–252. APIs such as 253 written for the native platform execute directly when called from OS 230, and do not require thunks.

Figure 3:
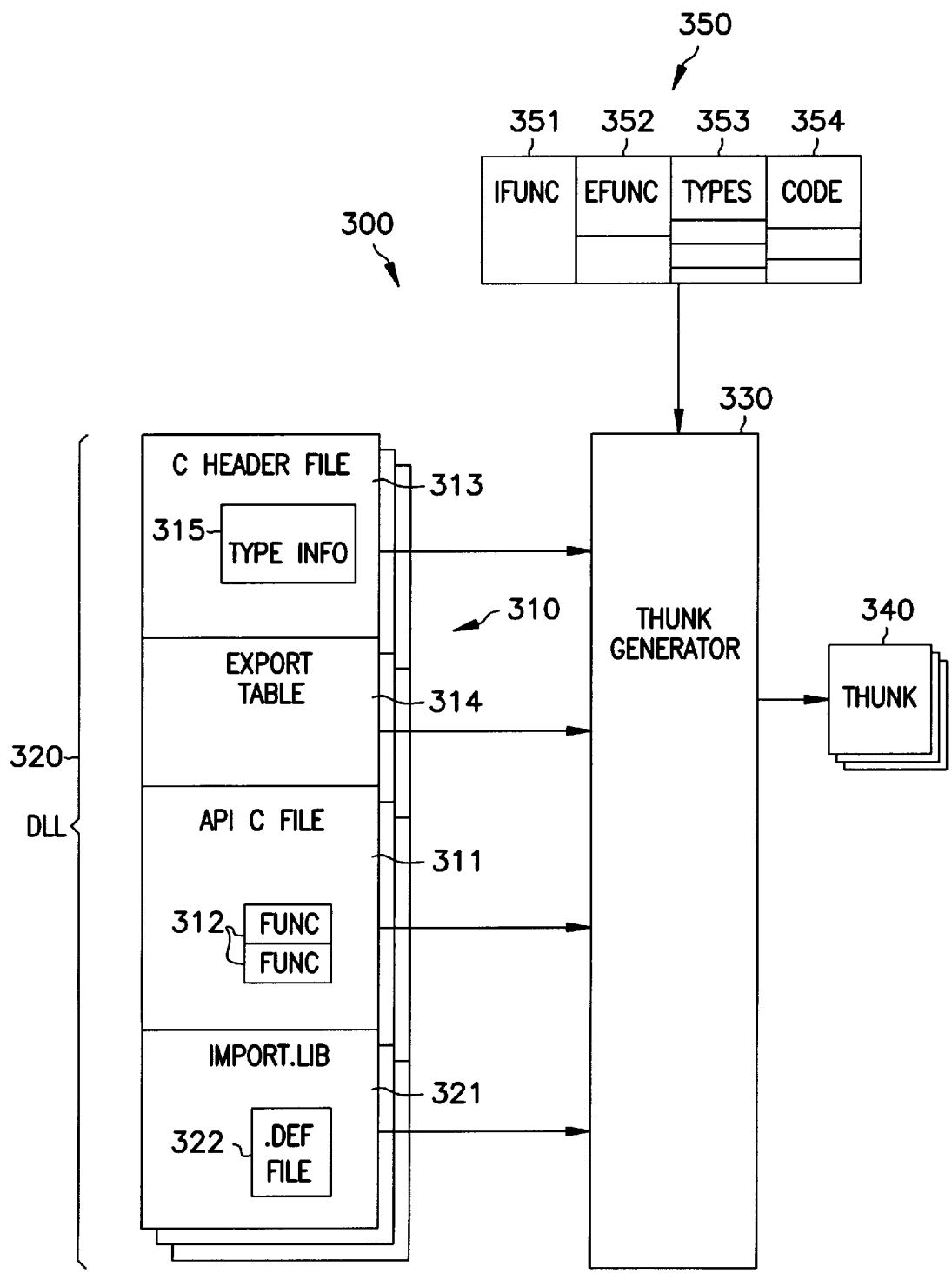
FIG. 3 is a high-level block diagram of a translator utility according to the invention, along with its inputs and outputs.

FIG. 3 is a high-level block diagram 300 showing a translator utility according to the invention, along with its inputs and outputs. Some of the elements shown in FIG. 2 have different labels in FIG. 3, to denote that the corresponding elements are in compiled object-code form in FIG. 2, but exist as source-code files in FIG. 3.

In its source-code form, each DLL 254, FIG. 2, is a collection 310 of files 311 each containing instructions in a language such as C for an API 250, FIG. 2. Each file represents one or more functions 312 to be performed by one of the APIs 251–252.

A module-definition file (.DEF) file 322 specifies the list of functions which are to be exported from DLL 320 as APIs. The .DEF file is compiled into an import library (.LIB) file 321. The .LIB file is significant because the API name exported from the DLL may differ from the function name in source file 311; for example, an entry FOO=BAR@4 in a .DEF file instructs the linker to export the function known internally as FOO from the DLL as BAR. Thunk generator 330 uses .LIB file 321 to associate an internal function name with an exported API name. C-language files have associated header (.H) files 313 that specify the external interface of their code file 311, such as data types and external variable names. In particular, header files include type information 315 for functions 312 in code files 311.

For example, a .H header file could contain a type definition such as:

```
Typedef struct tagFoo    {
       int member1;
       int member2;
}   *PFOO
and a function declaration:
       int AnApi    {PFOO arg1, char *};
Generator 330 stores this information for all APIs. The entries for the
above example might be:
          TYPENAME       struct tagFoo
             MEMBER LIST
                         MEMBER NAME       member 1
                         MEMBER TYPE       int
                         MEMBER OFFSET     0
                         MEMBER NAME       member 2
                         MEMBER TYPE       int
                         MEMBER OFFSET     4
          TYPENAME       PFOO
             INDIRECTION    1
             BASETYPE       struct tagFoo
          APINAME        AnApi
             RETURN TYPE          int
             ARG NAME             arg1
             ARG TYPE             PFOO
             ARG NAME             <noname>
             ARG TYPE             char *
```

Finally, a conventional definitions (.DEF) file 322 may instruct a conventional linker (not shown) in OS 230 to export an internal API name from DLL 320 as a different name.

Translation generator 330 uses information from files 311, 313, and 321 to build C-language source-code files 340 which can be compiled into the translation-code modules 260 in FIG. 2. The invention provides a novel set of template files 350 for this purpose. Template (.TPL) files are descriptions of how to generate translation-code modules ("thunks"). They comprise small amounts of hand-generated C code which implement generalized forms for iterating over API functions and their arguments, and for handling special cases which may arise in particular APIs. Each template has the following syntax:

```
[Type_of_Template]
TemplateName=Name_Of_Template
CGenBegin=
       <code to generate when this template is expanded>
       CGenEnd=
```

There are four types of template 350.

The iterated-function (IFunc) template 351 iterates over API functions. Generator 330 expands one of these for each exported function in an API. The IFunc template 351 is the default expansion for APIs. The following example template will generate a skeleton thunk 340.

```
[IFunc]
TemplateName=HostFuncs
CGenBegin=
void
wh@ApiName (PULONG BaseArgs, ULONG RetVal)
{
       @ApiFnRet *pRetVal = (@ApiFnRet *) RetVal;
       @Types (Locals)
       @Types (Body)
       @IfApiRet (*pRetval = ) @ApiName (@IfArgs (@ArgList
       (*(((@ArgType
                                                             *)
       (@ArgAddr (BaseArgs)))   @ArgMore(,))));
       @Types (Return)
}
CGenEnd=
```

Generator 330 expands each of the '@' prefixed keywords in template 351 from the data collected from files 313 and 321 for a particular API 310 as follows:

| | |
|---|---|
| @ApiName | Internal name of the API |
| @ApiFnRet | Return type of the API |
| @Types(x) | Expands Type templates of the form 'x' |
| @IfApiRet(x) | Expands 'x' if the return type of the API is non-void |
| @IfArgs(x) | Expands 'x' if the API has arguments |
| @ArgList(x) | Iterates over all arguments, expanding 'x' for each argument |
| @ArgType | Type of argument |
| @ArgAddr(x) | Address of the argument, relative to 'x' |
| @ArgMore(x) | Expands if there are more arguments after the current one |

For example, an API with prototype 'HWND FindWindowA (LPSTR 1pClass, LPSTR 1pWindow)' expands to:

```
whFindWindowA (PULONG pBaseArgs, ULONG RetVal)
{
   HWND *pRetVal = (HWND *) RetVal;
   *pRetVal = FindwindowA( *(LPSTR *) (pBaseArgs+0), * (LPSTR *)
(pBaseArgs+1) );
}
```

An exception-function (EFunc) template 352 recognizes a particular API name, and overrides the default IFunc template 351 for that API. The following example template 352 produces fixed code for the particular API named 'SetErrorMode'.

```
[EFunc]
TemplateName=SetErrorMode
CGenBegin=
void
wh@ApiName (PULONG BaseArgs, ULONG RetVal)
{
    @ApiFnRet *pRetVal = (@ApiFnRet *) RetVal;
    *pRetVal = SetErrorMode ((*(UINT *) pBaseArgs) | SEM_NOALIGNMENTFAULTEXCEPT)
    *pRetVal &= ~SEM_NOALIGNMENTFAULTEXCEPT;
}
CGenEnd=
```

EFunc templates provide a facility for custom-writing code for an API, while preserving robustness against API changes. Of course, the code for such an API can always be rewritten merely by rewriting its EFunc template. A types (Types) template 353 creates a thunk 340 for each parameter, or argument, of each API file 311 which matches a specified type name. Types templates are powerful in that generator 330 applies them automatically to new APIs, providing correct thunking without manual intervention. Consider the following examples:

```
[Types]
TemplateName=Locals
TypeName=LPSTR
IndLevel=0
CGenBegin=
        @ArgLocal = * ((@ArgType *) (pBaseArgs + @ArgOff));
CGenEnd=
[Types]
TemplateName=Body
TypeName=LPSTR
IndLevel=0
CGenBegin=
VALIDATE_LPSTR (@ArgNameLocal);
CGenEnd=
```

With these two templates, any API 311 which takes the C-language LPSTR data type automatically receives the special-purpose Types code in addition to the IFunc code for the default IFunc template. For example, the 'FindWindowA' API described above now expands to:

```
{
    HWND *pRetVal = (HWND *) RetVal;
    LPSTR lpClass = *((LPSTR *) (pBaseArgs + 0));
    LPSTR lpWindow = *((LPSTR *) (pBaseArgs + 1));
    VALIDATE_LPSTR (lpClass);
    VALIDATE_LPSTR (lpWindow);
    *pRetVal = FindWindowA ( lpClass, lpWindow );
}
```

A code template 354 operates like a macro. It contains code which may be common to a number of other templates, and is referred to by name in those templates. For example, if the line

```
*pRetVal = SetErrorMode ((* (UINT *) pBaseArgs) *
``` occurs many times in many different templates 351, 352, or 353, then that line could be placed in a code template such as one named, "serrm." The referring templates, such as the example above, then merely replace that line with the name of the macro, for example, "[@serrm]". The conventional C macro facility then replaces the name with the code; C macros can, of course, be much more complex than this simple example.

Although the above templates are shown as written in the C language, they are language-independent. Templates 350 may generate code in C++, in assembler language, or in any other desired form.

Figure 4:
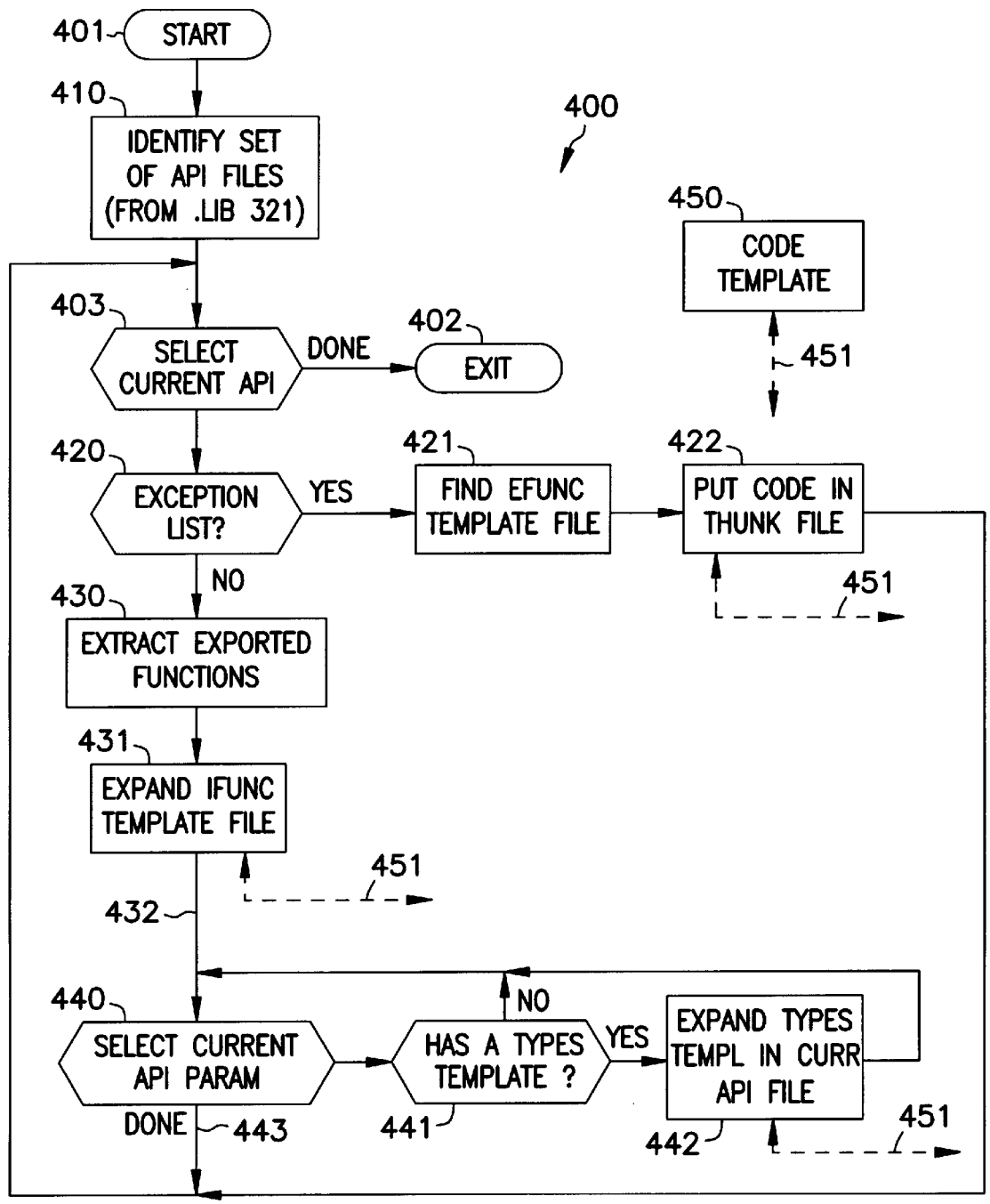
FIG. 4 is a flow diagram showing the operation of the translator of FIG. 3.

FIG. 4 describes the steps 400 carried out by translation-code generator 330, FIG. 3. The generator is run at 401 for every build of the operating system 230 or other entity whose APIs require regeneration. At its conclusion 402, the entire set of API translation-module source-code files 340 has been synchronized at the same level, and can be compiled in a conventional manner into the set of object-code modules 260, FIG. 2 which together form an API-translation portion (the "thunk layer") of emulator 240.

Block 410 scans all the DLLs 254 belonging to the OS 230 to identify the set of APIs (261, 262, . . . in FIG. 2) which require regeneration. The names of these APIs are in the export table 314 and in the import .LIB file 321 of each DLL, as previously described. (As a technical aside, the raw exports come from the import .LIB. However, many of them may be unnamed ordinals or renamed C functions. In order to obtain type information, generator 330 must reconstruct the name of the original function that implements each API. Thus, it must sometimes unmap the export name back to the function name.) Step 403 then sequentially selects a current API in the set for processing.

Step 420 may identify the current API as having an exception template 352, by a conventional table-lookup in a list of the exception-template names. If such a template exists, step 421 accesses the associated EFunc template, and step 422 places its source code into a thunk file 340 for that API.

If the current API is a normal API, step 430 reads export table 314 of its header file 313 to extract the names of all its exported functions. Step expands the IFunc template 351 for those functions, as described above. When step 431 has iterated through all the exported functions of the current API, exit 432 progresses to the next step.

Step 440 cycles through the parameters (arguments) of the current API, sequentially selecting one as a current parameter. If step 441 determines that a Types template 353 exists for this parameter type, then step 442 places the template's source code in the module 340, so that the API will process that argument type correctly. Most types templates substitute a different value for a parameter. However, a types template may perform other functions, such as validating the range of a parameter. Control passes to exit 443 when all Types templates have been processed.

Step 450 processes Code templates 354, FIG. 3. Whenever the name of a code template appears (as a macro name) in template-processing step 422, 432, or 442, dashed lines 451 call step 450 to expand a particular named code template and return the code to the calling template. Step 450 may actually occur later, when the thunk source-code files 340 are conventionally compiled into object-code modules 260.

It is to be understood that the above description is intended to be illustrative, and not restrictive. The invention may be used to provide for execution of interfaces from multiple prior platforms as opposed to just one. Further, template matching can be done in many different manners, such as by having a field in an interface which directly identifies a desired template. Many other embodiments will be apparent to those skilled in the art upon reviewing the above description. The scope of the invention should, therefore, be determined with reference to the appended claims, along with the full scope of equivalents to which such claims are entitled.

What is claimed is:

1. In a programmable digital computer, a method for generating a synchronized set of translation modules each containing program code representing a translated version of an interface module on a native platform, the method comprising:

identifying the set of interface modules written for the emulated platform and requiring translation for the second platform;

extracting from one of the modules data representing a group of functions exported by the one module;

matching data of the one module to a group of function templates, at least some of the templates containing generalized program code written for the native platform and performing functions from the emulated platform;

selecting at least one of the templates in response to the matching step;

for each template selected, converting the generalized program source code in the template into expanded program code constituting at least part of the translation module for the one module; and repeating the extracting matching selecting, and converting steps for other of the modules.

2. A method according to claim 1, further comprising:

determining that the one module matches one of a group of exception templates each containing program code; and generating at least part of the translation module for the one module from the program code of the one exception template.

3. A method according to claim 2, further comprising:

bypassing matching the one-module data against the function templates when the current module matches one of the group of exception templates.

4. A method according to claim 1 wherein the one module has at least one parameter having one of a group of types, further comprising matching the one parameter to one of a group of types templates; and generating at least some of the program code of the translation module for the one module from the one types template.

5. A method according to claim 1, further comprising:

determining that one of the templates specifies the name of one of a group of a code templates; and incorporating source code from the specified code template in the one template whenever the one template provides code for a translation module.

6. A method according to claim 1 wherein the interface modules have an import table and reside in at least one link library, and wherein the identifying step comprises:

scanning the link library; and reading the names of the interface modules in the set from the import tables.

7. A method according to claim 1, further comprising:

iterating the matching, selecting and converting steps over each of the functions in the group of functions.

8. A computer system for producing a set of synchronized translation modules each containing code for a translated version of a different interface representing that interface on a second platform, the system comprising:

a set of interface files each comprising source code for implementing one of the interfaces;

a set of header files associated with respective ones of the interface files and containing the names of functions exported by the respective interface files;

a group of function templates each containing generalized source code for executing a group of translation functions; and a generator for matching certain of the interface files to at least one of the function templates and for converting the generalized code of the one function template into expanded source code for executing at least one of those functions exported by the interface files, the expanded code forming at least a portion of the translation modules.

9. A computer system according to claim 8, further comprising a group of exception template files associated with certain ones of the translation modules, and wherein the generator produces source code forming at least part of the code of the translation modules from one of the exception templates instead of from the function templates.

10. A computer system according to claim 8, further comprising a group of types templates respectively containing source code for a group of data types found in certain of the interface modules, and wherein the generator incorporates forming a part of the translation modules from those of the types templates corresponding to the data types found in the certain interface modules.

11. A computer system according to claim 8, further comprising an import library alternative names of functions exported by the respective interface files, and wherein the generator responds to the alternative names rather than to the names in the set of header files.

12. A computer-readable medium having computer-executable instructions for generating translation code representing a translated version of an interface written for a first platform on a second, different platform, comprising:

selecting one of a plurality of generalized templates, each generalized template capable of performing a plurality of different functions based on information contained in an interface written for the first platform; and expanding the generalized template to produce modules constituting the translation code, the translation code representing the interface on the second platform.

13. A computer-readable medium having computer-executable instructions for generating a synchronized set of translation modules each containing program code representing a translated version of an interface module on a native platform, the method comprising:

identifying the set of interface modules written for the emulated platform and requiring translation for the second platform;

extracting from one of the modules data representing a group of functions exported by the one module;

matching data of the one module to a group of function templates, at least some of the templates containing generalized program code written for the native platform and performing functions from the emulated platform;

selecting at least one of the templates in response to the matching step;

for each template selected, converting the generalized program source code in the template into expanded program code constituting at least part of the translation module for the one module; and repeating the extracting, matching, selecting, and converting steps for other of the modules.

14. A medium according to claim 13, including further instructions for:

determining that the current module matches one of a group of exception templates each containing program code; and generating at least part of the translation module for the current module from the program code of the one exception template.

15. A medium according to claim 13 wherein the current module has at least one parameter having one of a group of types, the medium including further instructions for:

matching the one parameter to one of a group of types templates; and generating at least some of the program code of the current translation module from the one types template.

16. A method for automatically generating translation code representing translated versions of interfaces written for a first platform on a second, different platform, comprising:

constructing a generalized template capable of performing a plurality of different functions;

extracting a plurality of functions performed by the interfaces written for the first platform; and expanding the generalized template for each of the function to produce modules constituting the translation code, the translation code representing all of the functions performed by the interfaces.

17. A method according to claim 16, further comprising:

constructing a plurality of additional templates each associated with a particular type of parameter in the interfaces; and generating translation code from one of the additional templates for the parameters associated with any of the additional templates.

18. A method for automatically generating translation code representing a translated version of an interface written for a first platform on a second, different platform, comprising:

selecting one of a plurality of generalized templates, each generalized template capable of performing a plurality of different functions based on information contained in an interface written for the first platform; and expanding the generalized template to produce modular, constituting the translation code the translation code representing the interface on the second platform.

19. The method of claim 18 and further comprising the step of repeating the selecting and expanding steps for each interface written for the first platform until all interfaces in a program are translated.

20. The method of claim 18, wherein the information comprises functions performed by the interface.

21. A digital computer system for executing an application program written for an emulated platform on a native platform, comprising:

an operating system executing on the native platform;

a set of interface modules executable on the emulated platform;

an emulator for executing on the native platform an application program written for an emulated platform and having a set of interfaces executable on the emulated platform;

a group of function templates each containing generalized code for executing a function;

a group of types templates each containing conversion code for converting a data type of the emulated platform to a data type of the native platform; and a set of translation modules for executing translated versions of respective ones of the interface modules on the native platforms, the translation modules containing expanded code from the function templates and conversion code from the types templates.

22. A digital computer system according to claim 21, further comprising a group of exception templates containing code associated with particular respective ones of the interface modules, wherein at least some of the translation modules contain code directly contained in the exception modules.

* * * * *

UNITED STATES PATENT AND TRADEMARK OFFICE
CERTIFICATE OF CORRECTION

PATENT NO.: 6,026,238

DATED: Feb. 15, 2000

INVENTOR(S): Bond et al.

It is certified that error appears in the above-identified patent and that said Letters Patent is hereby corrected as shown below:

In the assignee, delete "Corporatrion" and insert --Corporation--, therefore.

In column 12, line 12, delete "modular" and insert --modules--, therefore.

Signed and Sealed this

Twenty-ninth Day of May, 2001

Attest:

NICHOLAS P. GODICI

Attesting Officer

Acting Director of the United States Patent and Trademark Office